United States Patent (10) Patent No.: US 10,429,263 B2
Kikuchi et al. (45) Date of Patent: Oct. 1, 2019

(54) PRESSURE MEASURING DEVICE AND EXHAUST SYSTEM USING THE SAME, AND SUBSTRATE PROCESSING APPARATUS

(71) Applicant: TOKYO ELECTRON TOHOKU LIMITED, Minato-ku, Tokyo (JP)

(72) Inventors: Satoshi Kikuchi, Oshu (JP); Tsuneyuki Okabe, Oshu (JP); Satoru Koike, Oshu (JP)

(73) Assignee: TOKYO ELECTRON LIMITED, Tokyo (JP)

(*) Notice: Subject to any disclaimer, the term of this patent is extended or adjusted under 35 U.S.C. 154(b) by 150 days.

(21) Appl. No.: 15/459,211

(22) Filed: Mar. 15, 2017

(65) Prior Publication Data

US 2017/0268952 A1    Sep. 21, 2017

(30) Foreign Application Priority Data

Mar. 18, 2016 (JP) .................. 2016-055220

(51) Int. Cl.
  *G01L 27/00* (2006.01)
  *G01L 9/00* (2006.01)
  *G01L 19/00* (2006.01)

(52) U.S. Cl.
  CPC .......... *G01L 27/002* (2013.01); *G01L 9/0072* (2013.01); *G01L 19/0015* (2013.01)

(58) Field of Classification Search
  CPC .. G01L 27/002; G01L 19/0015; G01L 9/0072
  USPC ......................................................... 73/1.71
  See application file for complete search history.

(56) References Cited

U.S. PATENT DOCUMENTS

| 5,575,853 A | * | 11/1996 | Arami | C23C 16/4412 118/708 |
| 5,739,429 A | * | 4/1998 | Schmitkons | B05B 7/14 73/196 |
| 6,079,443 A | * | 6/2000 | Hutton | G01L 19/0015 137/597 |
| 2006/0086259 A1 | * | 4/2006 | Okajo | H01J 37/3244 99/342 |
| 2008/0017105 A1 | * | 1/2008 | Moriya | B01J 4/008 118/708 |
| 2009/0170337 A1 | * | 7/2009 | Yuasa | H01L 21/67253 438/758 |
| 2011/0265899 A1 | * | 11/2011 | Cruse | G01L 27/005 137/565.23 |

(Continued)

FOREIGN PATENT DOCUMENTS

| JP | 61124125 A | 6/1986 |
| JP | 200463968 A | 2/2004 |
| JP | 2014137275 A | 7/2014 |

(Continued)

*Primary Examiner* — Marrit Eyassu
(74) *Attorney, Agent, or Firm* — Nath, Goldberg & Meyer; Jerald L. Meyer

(57) ABSTRACT

There is provided a pressure measuring device including: a first pressure gauge connected to a processing chamber configured to process a process target and configured to measure an internal pressure of the processing chamber when the process target is being processed; a second pressure gauge connected to the processing chamber; and a first switching valve configured to disconnect the second pressure gauge from the processing chamber when the process target is being processed inside the processing chamber.

9 Claims, 2 Drawing Sheets

(56) References Cited

U.S. PATENT DOCUMENTS

2015/0293008 A1\* 10/2015 Ramakrishnan ..... G01N 15/088
73/1.57

FOREIGN PATENT DOCUMENTS

| WO | 2007037233 A1 | 4/2007 |
| WO | 2008001688 A1 | 1/2008 |

\* cited by examiner

PRESSURE MEASURING DEVICE AND EXHAUST SYSTEM USING THE SAME, AND SUBSTRATE PROCESSING APPARATUS

CROSS-REFERENCE TO RELATED APPLICATION

This application claims the benefit of Japanese Patent Application No. 2016-055220, filed on Mar. 18, 2016, in the Japan Patent Office, the disclosure of which is incorporated herein in its entirety by reference.

TECHNICAL FIELD

The present disclosure relates to a pressure measuring device and an exhaust system using the same, and a substrate processing apparatus.

BACKGROUND

A substrate processing apparatus having a configuration in which pressure measuring parts are installed corresponding to the number of types of gases supplied into a processing chamber is known in the conventional art. The processing chamber receives substrates such that each substrate is dedicated to the respective gases, and a film is not formed on a diaphragm sensor that constitutes each of the pressure measuring parts so as not cause an error in measured pressure values.

In addition, a pressure measuring device is know in the art in which a circular plate is installed at a position facing a diaphragm to form an annular flow path, and a solid substance adheres to a place at which the diaphragm is less affected by stress, so that the effect of the stress occurred by the adhered solid substance on a deformation of the diaphragm is reduced.

However, such configurations, although possible to reduce the occurrence of an error in a pressure gauge, fail to accurately recognize the error of the pressure gauge. To address this requires periodically checking a shifted amount of the pressure gauge and periodically performing a zero-adjustment by which the pressure gauge is reset to zero in a state where a processing chamber is exhausted up to a maximum vacuum level.

Such zero adjustment is an approximate-level compensation in which the pressure gauge is reset to zero when a vacuum level is maximum, namely closest to zero), rather than accurately recognizing an error or shifted amount of the pressure gauge and performing a compensation based on the recognized result. This configuration fails to accurately compensate the pressure gauge. There is another technique for connecting a high precision pressure gauge during maintenance and compensating an erroneous pressure gauge by identifying a difference between these pressure gauges. In any case, it is impossible to accurately check a replacement time of the erroneous pressure gauge. Thus, only an ex-post measure that the erroneous pressure gauge is initially replaced when some problems occur, were possible.

SUMMARY

Some embodiments of the present disclosure provide a pressure measuring device which is capable of accurately recognizing an error of a pressure gauge and precisely compensating the error based on the recognized result, and an exhaust system using the same, and a substrate processing apparatus.

According to one embodiment of the present disclosure, there is provided a pressure measuring device including: a first pressure gauge connected to a processing chamber configured to process a process target and configured to measure an internal pressure of the processing chamber when the process target is being processed; a second pressure gauge connected to the processing chamber; and a first switching valve configured to disconnect the second pressure gauge from the processing chamber when the process target is being processed inside the processing chamber.

According to another embodiment of the present disclosure, there is provided an exhaust system including: the aforementioned pressure measuring device; an exhaust part connected to the processing chamber through a conduit; and a pressure adjustment valve installed in the conduit and configured to adjust the internal pressure of the processing chamber, which is to be exhausted by the exhaust part, wherein the control part is configured to control a set value of the pressure adjustment valve using a shifted amount in the error of the first pressure gauge.

According to yet another embodiment of the present disclosure, there is provided a substrate processing apparatus including: the aforementioned exhaust system; a processing chamber connected to the exhaust system; a substrate holding part installed inside the processing chamber and configured to hold the substrate; and a process gas supply part configured to supply a process gas into the processing chamber.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Hereinafter, an embodiment of the present disclosure will be described with respect to the drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Figure 1:
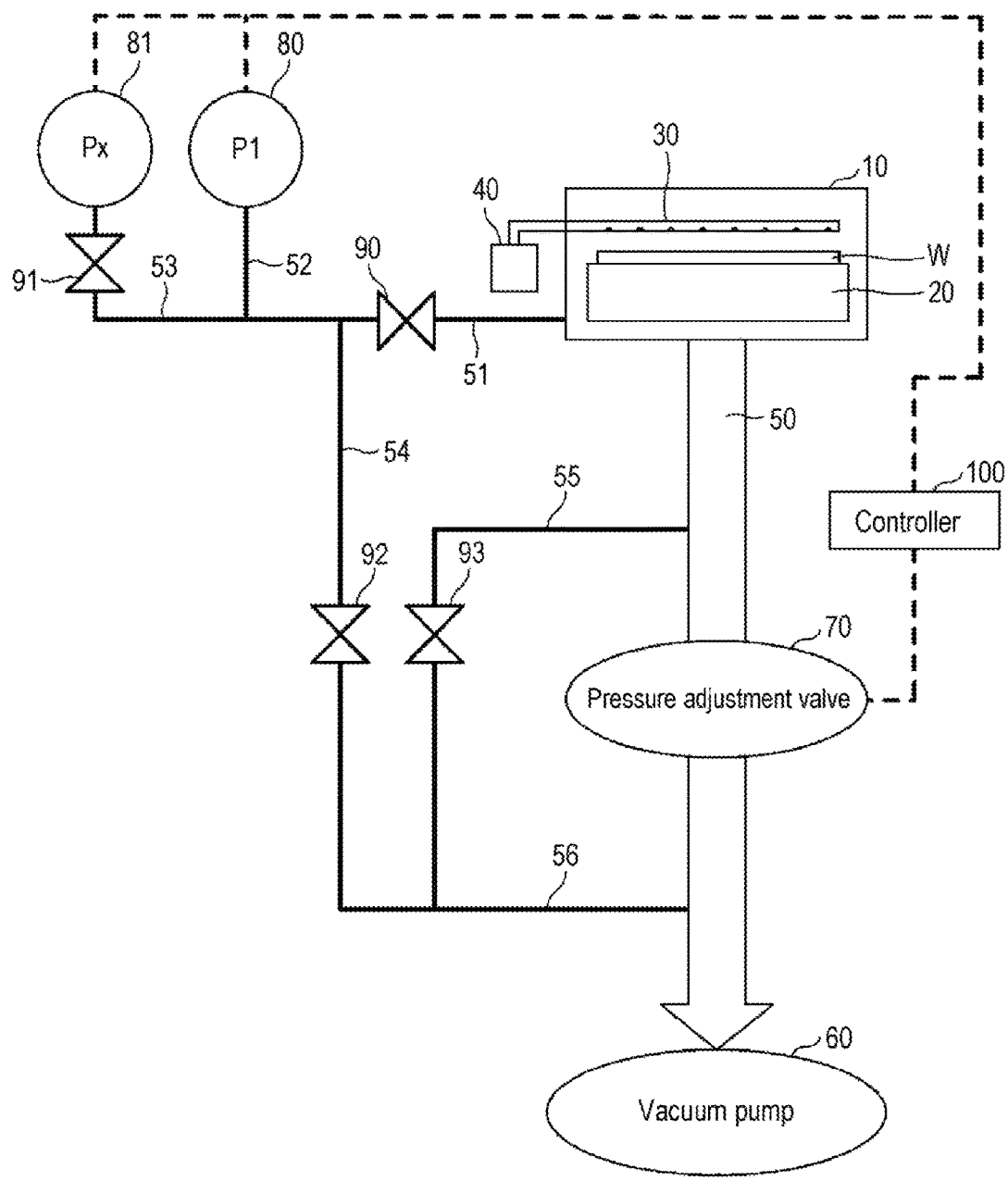
FIG. 1 is an overall configuration view showing an example of a pressure measuring device, an exhaust system using the same and a substrate processing apparatus, according to an embodiment of the present disclosure.

FIG. 1 is an overall configuration view showing an example of a pressure measuring device and an exhaust system using the same, and a substrate processing apparatus, according to an embodiment of the present disclosure The pressure measuring device according to an embodiment of the present disclosure includes pressure gauges 80 and 81, switching valves 90 and 91, a controller 100, and conduits 51 to 53.

In addition, the exhaust system according to the present embodiment includes conduits 50 and 54 to 56, a vacuum pump 60, a pressure adjustment valve 70, and switching valves 92 and 93, in addition to the above-described pressure measuring device.

Further, the substrate processing apparatus according to the present embodiment includes a processing chamber 10, a substrate holding table 20, a process gas supply part 30, and a process gas supply source 40, in addition to the above-mentioned exhaust system.

In FIG. 1, the processing chamber 10 is coupled to the vacuum pump 60 through the conduit 50. The pressure adjustment valve 70 is installed in the conduit 50 between the processing chamber 10 and the vacuum pump 60. In addition, the processing chamber 10 and the pressure gauges 80 and 81 are connected with each other through the conduits 51 to 53. The pressure gauge 80 is coupled to the common conduit 51 through the conduit 52. The pressure gauge 81 is coupled to the common conduit 51 through the conduit 53. In addition, the switching valve 91 is installed in the conduit 53. In addition, the conduit 54 is connected to the conduit 51, and is coupled to the conduit 50 through the conduit 56. The switching valve 92 is installed in the conduit 54. Furthermore, the conduit 55 is connected to the conduit 50, and is joined with the conduit 54 in the conduit 56 connected to the conduit 50. The switching valve 93 is installed in the conduit 55.

The processing chamber 10 is to perform a predetermined process with respect to a process target received therein. The process target may be a variety of objects that require a process or treatment. However, in the present embodiment, an example in which the pressure measuring device and the exhaust system are applied to the substrate processing apparatus configured to process a substrate, specifically a wafer W, will be described. However, the pressure measuring device according to the present embodiment may be applied to a variety of devices inclusive of a processing equipment as long as they are required to perform a pressure measurement under process. Further, the exhaust system may be applied to a variety of apparatuses that require an exhaust process. In addition, the substrate processing apparatus may be applied to a variety of substrate processing apparatuses such as a film forming apparatus, an etching apparatus or an annealing apparatus as long as they include an exhaust system and are configured to process a substrate. Hereinafter, a description will be made as to an example in which the substrate processing apparatus is configured as a film forming apparatus.

The substrate holding table 20 and the process gas supply part 30 are installed in the processing chamber 10. The substrate holding table 20 is a substrate holding part for holding the wafer W (substrate) as an object to be processed. The substrate holding table 20 may be configured in the form of a table as shown in FIG. 1. Further, the substrate holding table 20 may be a holding part such as a wafer boat which holds a plurality of wafers W such that they are arranged to overlap each other in a vertically spaced-apart relationship when viewed from the top. The configuration of the substrate holding table 20 for holding the substrates is not particularly limited.

The process gas supply part 30 is to supply a process gas for processing the wafer W held on the substrate holding table 20. The process gas may be a process gas for forming a film on the wafer W, or a gas for etching the wafer W. When the process gas comes into contact with diaphragms of the pressure gauges 80 and 81 and when a film formation or the like is performed, an extra stress may be applied to the diaphragms. This makes it impossible to accurately measure pressure. The pressure measuring device according to the present embodiment prevents a measurement error from being generated in the pressure gauge 80 even if such a process gas is supplied to the wafer for the substrate process.

The process gas supply source 40 is to supply a predetermined process gas to the process gas supply part 30, which is adapted to the substrate process.

The vacuum pump 60 is an exhaust part for evacuating the interior of the processing chamber 10. In addition, the exhaust part is not limited to the vacuum pump 60 which performs a vacuum-exhaust operation as long as it can perform an exhaust operation. In the present embodiment, an example in which the interior of the processing chamber 10 is vacuum-exhausted using the vacuum pump 60 as the exhaust part will be described.

The conduit 50 is a conduit for exhaust through which the processing chamber 10 and the vacuum pump 60 are connected to each other. The conduit 50 may be other various conduits as long as they can exhaust the interior of the processing chamber 10.

The pressure adjustment valve 70 is an adjustment part for adjusting an internal pressure of the processing chamber 10. The pressure adjustment valve 70 adjusts the internal pressure of the processing chamber 10 by adjusting, for example, an opening degree of a valve. Specifically, as the opening degree of the valve increases, an exhaust amount of the vacuum pump 60 is increased so that the internal pressure of the processing chamber 10 is lowered. On the contrary, as the opening degree of the valve decreases, the exhaust amount of the vacuum pump 60 is decreased so that the internal pressure of the processing chamber 10 is raised. For example, the pressure adjustment valve 70 can adjust the internal pressure of the processing chamber 10 through the aforementioned operation. Thus, the internal pressure of the processing chamber 10 is set by the pressure adjustment valve 70.

In addition, the pressure adjustment valve 70 is basically designed to adjust the internal pressure of the processing chamber 10 such that a pressure to be adjusted becomes a pressure set according to a recipe. However, in the present embodiment, the controller 100 compensates the set pressure if desired. Details thereof will be described later.

The pressure gauge 80 is a process pressure gauge that measures the internal pressure of the processing chamber 10 when the substrate process is being performed inside the processing chamber 10. Therefore, when the wafer W is being processed inside the processing chamber 10, the switching valve 90 is opened and the pressure gauge 80 is coupled to the processing chamber 10 through the conduits 51 and 52. The conduit 51 is a common conduit through which both the pressure gauges 80 and 81 are connected to the processing chamber 10. The switching valve 90 is installed in the conduit 51 used as the common conduit and determines whether both the pressure gauges 80 and 81 are required to be connected to the processing chamber 10.

Meanwhile, the conduit 52 is a branch conduit that is branched from the conduit 51 and is connected to only the pressure gauge 80. A switching valve is not installed in the branch conduit 52. Thus, if the switching valve 90 is opened, the pressure gauge 80 is automatically coupled to the processing chamber 10, thereby measuring the internal pressure of the processing chamber 10. Therefore, when the wafer W is being processed inside the processing chamber 10, the switching valve 90 remains opened.

The pressure gauge 81 is a compensation pressure gauge which is configured to measure the internal pressure of the processing chamber 10 when the substrate process is not being performed inside the processing chamber 10, without having to measure the internal pressure of the processing chamber 10 when the substrate process is being performed inside the processing chamber 10. Therefore, the pressure gauge 81 is required to be disconnected from the processing chamber 10 during the substrate process. To do this, the switching valve 91 is installed in the conduit 53.

When the wafer W is being processed inside the processing chamber 10, the switching valve 91 remains closed such that the pressure gauge 81 is disconnected from the processing chamber 10. Thus, even if the wafer W is being processed inside the processing chamber 10, it is possible to keep the pressure gauge 81 in a clean state which is not exposed to the process gas used inside the processing chamber 10.

In addition, the pressure gauges 80 and 81 may have a variety of configurations. For example, the pressure gauges 80 and 81 may be configured in a generally-used diaphragm type. Such a diaphragm type pressure gauge, which has a sensitive portion configured with a diaphragm, measures a pressure by recognizing a displacement caused by bending through the use of an electrostatic capacitance or the like. If a solid substance adheres to the diaphragm due to a film formation or the like, the diaphragm may be displaced due to shrinkage of the solid substance. This shifts a zero point, thus causing an error.

When the wafer W is being processed inside the processing chamber 10, a process gas supplied into the processing chamber 10 may flow into the pressure gauge 80. As such, the solid substance may adhere to the diaphragm of the pressure gauge 80, which causes an error.

Meanwhile, when the wafer W is being processed inside the processing chamber 10, the switching valve 91 remains closed to disconnect the pressure gauge 81 from the processing chamber 10. Thus, the pressure gauge 81 is kept clean. When the process of the wafer W is stopped and the adjustment by the pressure gauge 80 is performed, the switching valve 91 is opened such that both the pressure gauges 80 and 81 measure the internal pressure of the processing chamber 10. In this case, since the process gas is not supplied into the processing chamber 10, no process gas flows into both the pressure gauges 80 and 81 from the processing chamber 10. Therefore, both the pressure gauges 80 and 81 can measure the internal pressure of the processing chamber 10 in a clean state.

In some embodiments, in the case where the adjustment by the pressure gauge 80 is performed, the pressure measurement may be performed in a state in which the interior of the processing chamber 10 is exhausted at a maximum up to a maximum vacuum level of the vacuum pump 60, which is a maximum ability. The reason for this is that the error in the pressure measurement in such a state is minimal.

The pressure gauges 80 and 81 simultaneously measure the internal pressure of the processing chamber 10 under the same condition, which makes it possible to recognize an error (shifted amount) caused in the pressure gauge 80. That is to say, since the pressure gauge 81 exhibits a correct pressure, a difference between the pressure gauge 80 and the pressure gauge 81 is recognized as the error of the pressure gauge 80.

As described above, the pressure gauge 81 as a compensation pressure gauge is installed which is disconnected from the processing chamber 10 during the process of the wafer W and is connected to the processing chamber 10 only when the adjustment by the pressure gauge 80 is performed. By performing the connection and the disconnection using the switching valve 91 installed in the branch conduit 53, it is possible to accurately recognize a measurement error caused in the pressure gauge 80.

In addition, although in FIG. 1, both the pressure gauges 80 and 81 are coupled to the processing chamber 10 through the common conduit 51, the present disclosure is not limited thereto. In some embodiments, the pressure gauges 80 and 81 may be separately and independently connected to the processing chamber 10. In this case, the pressure gauges 80 and 81 may simultaneously measure the internal pressure of the processing chamber 10 under the same condition. Thus, it is possible to measure an error of the pressure gauge 80. However, in the above configuration, an extra conduit or completely-separated conduit is required to be additionally employed. In this case, conduits installed in the pressure gauges 80 and 81 may not be connected to the conduit 51 in a common condition, which causes a slight difference in connection condition. Thus, as shown in FIG. 1, the pressure gauges 80 and 81 are configured to be connected to the processing chamber 10 through the common conduit 51.

The controller 100 is a control part for setting a pressure of the pressure adjustment valve 70 based on pressure values measured by the pressure gauges 80 and 81. The controller 100 can monitor the pressure values measured by the pressure gauges 80 and 81, and recognize the measured pressure values. Therefore, the controller 100 is able to recognize the shifted error caused in the pressure gauge 80 as a process pressure gauge, based on a difference between the measured pressure values of the pressure gauge 80 and pressure gauge 81.

The controller 100 calculates a compensation value for compensating the measurement error of the pressure gauge 80, and sets the pressure of the pressure adjustment valve 70 using the compensation value thus calculated. For example, if an error caused in the pressure gauge 80 is +0.5 Torr, the pressure gauge 80 may output a measured pressure value higher by 0.5 Torr than the actual pressure. Therefore, in the case where a set pressure according to a recipe is 2.0 Torr, if the set pressure of the pressure adjustment valve 70 is inputted as 2.0 Torr, even though the initial pressure is controlled to be 2.0 Torr by the pressure adjustment valve 70, the pressure gauge 80 may output a pressure of 2.5 Torr. The controller 100 performs a feedback control based on the value thus outputted and determines that the measured pressure of 2.5 Torr is higher than a target pressure of 2.0 Torr by 0.5 Torr, thus performing an adjustment for reducing the output pressure by 0.5 Torr. Therefore, the actual internal pressure of the processing chamber 10 may be controlled to be 1.5 Torr, which fails to set the pressure according to the recipe. Accordingly, in such a case, the controller 100 executes a compensation operation of setting the target pressure of the pressure adjustment valve 70 to 2.5 Torr. If the actual internal pressure of the processing chamber 10 is set to be 2.5 Torr by the pressure adjustment valve 70, the pressure gauge 80 outputs a measured pressure of 3.0 Torr. The controller 100 performs the feedback control based on the measured pressure and determines that the measured pressure of 3.0 Torr is higher than the target pressure of 2.5 Torr by 0.5 Torr. Thus, the controller 100 controls the pressure adjustment valve 70 to perform the adjustment (control) of reducing the output pressure by 0.5 Torr. Then, the actual internal pressure of the processing chamber 10 is controlled to be 2.0 Torr, which is the set pressure according to the recipe.

Even in the case where the pressure gauge 80 exhibits a negatively-shifted error, the pressure gauge 80 may be controlled in the same manner as the above. For example, if the pressure gauge 80 exhibits an error shifted by −0.5 Torr, the target pressure of the pressure adjustment valve 70 is set to be 1.5 Torr, which is lower by 0.5 Torr than the set pressure of 2.0 Torr according to recipe of 2.0 Torr. In this case, when the actual internal pressure of the processing chamber 10 is 2.0 Torr, the pressure gauge 80 outputs a measured pressure of 1.5 Torr. Therefore, it is possible to control the actual internal pressure to be 2.0 Torr.

As described above, by calculating a shifted amount to be used in shift-compensating the pressure gauge 80 and setting the target pressure of the pressure adjustment valve 70 to be increased (added) based on the calculated shifted amount, it is possible to control the internal pressure of the processing chamber 10 to become the set pressure according to the recipe. In this case, the controller 100 merely shifts the target pressure of the pressure adjustment valve 70, and then performs a general feedback control. Thus, there is no need to perform a detailed calculation process for every feedback control, which makes it possible to reduce a calculation process load.

In addition, in order to execute the aforementioned calculation process, the controller 100 may be configured as, for example, a microcomputer that includes a CPU (Central Processing Unit) and memory parts such as a ROM (Read Only Memory), a RAM (Random Access Memory) and the like, and operates according to a program. Alternatively, the controller 100 may be configured as an electronic circuit such as an ASIC (Application Specific Integrated Circuit) that is an integrated circuit in which a plurality of function circuits is integrated for a specific use. As described above, the controller 100 may be configured in a variety of other forms as long as they are able to perform the aforementioned calculation process and control.

In addition, information on the recipe may be recorded in, for example, a storage medium, and may be installed in the controller 100 from the storage medium.

The conduit 54 constitutes a portion of a bypass line for directly connecting the processing chamber 10 and the vacuum pump 60. The switching valve 92 is installed in the conduit 54. The processing chamber 10 is evacuated by the vacuum pump 60 through the conduit 50 during the normal process of the wafer W. However, solid substances often adhere onto an inner surface of the conduit 50 due to the effect of the process gas 30 or the like. As described above, the switching valves 90 and 91 are opened to perform the error measurement and adjustment for the pressure gauge 80. At this time, the interior of the processing chamber 10 is required to be evacuated up to the maximum vacuum level, which results in a prolonged process time. In addition, the adhesion of the solid substances onto the inner surface of the conduit 50 may deteriorate the exhaust efficiency.

In the present embodiment, the bypass lines 51, 54, and 56 are installed to directly connect the processing chamber 10 and the vacuum pump 60. Accordingly, when adjusting the pressure gauge 80, the switching valve 92 installed in the conduit 54 is opened such that the interior of the processing chamber 10 is exhausted through a series of the bypass lines 51, 54, and 56, as well as the conduit 50. Among the bypass lines 51, 54 and 56, the conduits 54 and 56 are not used during the normal process. Thus, no solid substances adhere onto the conduits 54 and 56 so that they are kept clean. Accordingly, when adjusting the pressure gauge 80, by opening the switching valve 92 installed in the conduit 54 as well as the switching valves 90 and 91, it is possible to efficiently perform the vacuum-exhaust operation through the bypass lines 51, 54, and 56 and reduce the compensation time.

As described above, the exhaust system and the substrate processing apparatus according to the present embodiment can not only accurately compensate the pressure gauge 80 but also shorten the compensation time.

Further, the conduit 55 and the switching valve 93 are a bypass line and a switching valve, respectively, which are used in exhausting the interior of the processing chamber 10 to the extent of a pressure closer to atmospheric pressure when starting the operation of the vacuum pump 60. The conduit 55 and the switching valve 93 have the same configuration as a general exhaust system. The conduits 54 and 55 are joined with each other at the conduit 56 that constitutes a portion of the bypass lines. In addition, the conduit 56 is connected to the conduit 50.

As described above, according to the pressure measuring device and the exhaust system using the same, and substrate processing apparatus according to the present embodiment, it is possible to accurately recognize an error caused in the pressure gauge 80 as a process pressure gauge and control the pressure adjustment valve 70 so as to compensate the error. Furthermore, even in such error compensation, it is possible to perform the compensation operation in a short period of time using the bypass lines 51, 54 and 56.

Figure 2:
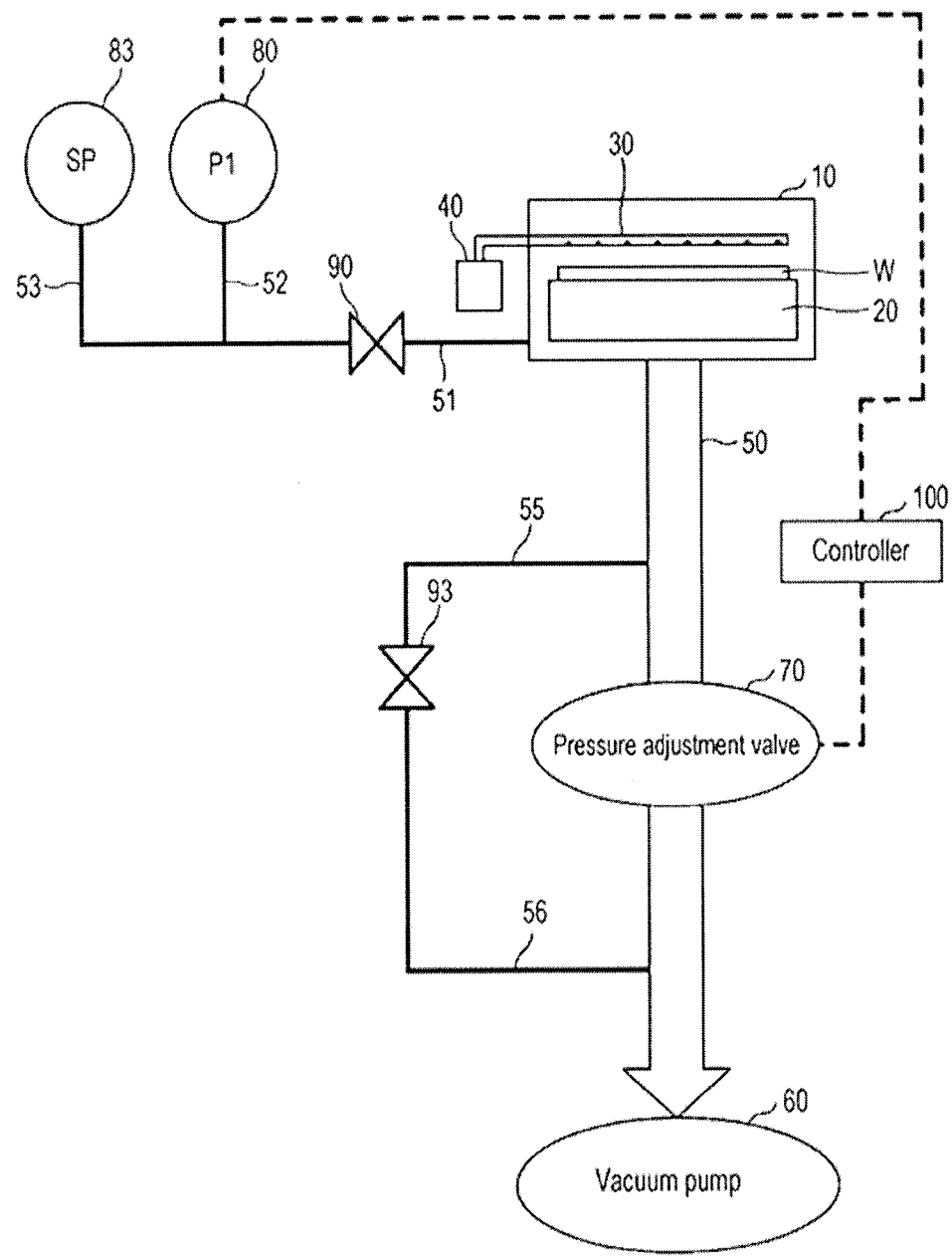
FIG. 2 is a view showing a pressure measuring device, an exhaust system, and a substrate processing apparatus according to a comparative example.

FIG. 2 is a view showing a pressure measuring device, an exhaust system, and a substrate processing apparatus, which have been conventionally used, according to a comparative example. In FIG. 2, the same components as those shown in FIG. 1 will be designated by like reference numerals. Respective components shown in FIG. 2 are the same as those shown in FIG. 1 except for a pressure gauge 83 installed only when performing compensation.

In FIG. 2, the pressure gauge 83 is connected only when checking an error of the pressure gauge 80. In addition, the compensation performed by the pressure gauge 83 may be manually implemented, and is not fed back to the controller 100. Thus, a compensation value obtained at the pressure gauge 83 is not reflected to a set pressure of the pressure adjustment valve 70. In addition, the bypass lines 55 and 56 used at the time of starting the operation of the vacuum pump 60 are installed, while the conduit 54 as a bypass line for compensation is not installed. This makes it difficult to accurately recognize an error of the pressure gauge 80 and to compensate the pressure gauge 80 based on the recognized error. Accordingly, it can be seen that the pressure measuring device, the exhaust system and the substrate processing apparatus according to the embodiment have good configurations, compared to those in the comparative example.

According to the present disclosure, it is possible to accurately recognize an error of a pressure gauge.

While certain embodiments have been described, these embodiments have been presented by way of example only, and are not intended to limit the scope of the disclosures. Indeed, the embodiments described herein may be embodied in a variety of other forms. Furthermore, various omissions, substitutions, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A pressure measuring device comprising:
   a first pressure gauge connected to a processing chamber, which is configured to process a process target, and configured to measure a first internal pressure of the processing chamber;

a second pressure gauge connected to the processing chamber and configured to measure a second internal pressure of the processing chamber;

a first switching valve configured to disconnect the second pressure gauge from the processing chamber when the process target is being processed inside the processing chamber; and a controller configured to measure an error of the first pressure gauge based on a difference between the first internal pressure and the second internal pressure when measured simultaneously by the first pressure gauge and the second pressure gauge when processing of the process target is stopped.

2. The device according to claim 1, further comprising:

a join conduit through which the first pressure gauge and the second pressure gauge are connected to the processing chamber; and a branch conduit through which the second pressure gauge alone is connected to the join conduit, wherein the first switching valve is installed in the branch conduit.

3. The device according to claim 1, wherein the first switching valve remains opened when the process target is not being processed inside the processing chamber, and the second pressure gauge is configured to measure the internal pressure of the processing chamber when the first switching valve remains opened.

4. An exhaust system comprising:

the pressure measuring device of claim 1;

an exhaust part connected to the processing chamber through a conduit; and a pressure adjustment valve installed in the conduit and configured to adjust the internal pressure of the processing chamber, which is to be exhausted by the exhaust part, wherein the controller is further configured to control a set value of the pressure adjustment valve using a shifted amount in the error of the first pressure gauge.

5. The system according to claim 4, wherein the exhaust part is a vacuum pump.

6. The system according to claim 4, further comprising:

a bypass line including a different conduit from the conduit and configured to directly connect the processing chamber and the exhaust part while bypassing the pressure adjustment valve; and a second switching valve configured to disconnect the bypass line from the processing chamber when the process target is being processed inside the processing chamber, and configured to be opened so as to establish a direct connection between the processing chamber and the exhaust device through the bypass line when the second pressure gauge measures the internal pressure of the processing chamber.

7. The system according to claim 6, wherein the second switching valve is installed in the bypass line.

8. The system according to claim 4, wherein the process target is a substrate.

9. A substrate processing apparatus comprising:

the exhaust system of claim 8;

a processing chamber connected to the exhaust system;

a substrate holding part installed inside the processing chamber and configured to hold the substrate; and a process gas supply part configured to supply a process gas into the processing chamber.

* * * * *